United States Patent
Zhu et al.

(10) Patent No.: US 10,101,204 B2
(45) Date of Patent: Oct. 16, 2018

(54) METHOD FOR DESIGING FREEFORM SURFACE IMAGING OPTICAL SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Tong Yang, Beijing (CN); Xiao-Fei Wu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/730,682

(22) Filed: Oct. 11, 2017

(65) Prior Publication Data

US 2018/0180479 A1 Jun. 28, 2018

(30) Foreign Application Priority Data

Dec. 22, 2016 (CN) .......................... 2016 1 1213648

(51) Int. Cl.
*G01B 11/24* (2006.01)
*G01J 3/02* (2006.01)
*G01J 3/28* (2006.01)

(52) U.S. Cl.
CPC .......... *G01J 3/0289* (2013.01); *G01J 3/2823* (2013.01); *G01J 2003/283* (2013.01)

(58) Field of Classification Search
CPC .... G01J 3/02; G01J 3/28; G01J 3/0289; G01J 3/2823; G01J 2003/283; G06F 17/50; G06F 17/16; G06F 17/13
See application file for complete search history.

(56) References Cited

U.S. PATENT DOCUMENTS 8,035,898 B2 * 10/2011 Minano .............. G02B 27/0012
359/642
2005/0086032 A1 * 4/2005 Benitez .............. G02B 27/0012
703/1

* cited by examiner

*Primary Examiner* — Jamil Ahmed
(74) *Attorney, Agent, or Firm* — ScienBiziP, P.C.

(57) ABSTRACT

An initial system and a constraint condition are established. All freeform surfaces are obtained by surface fitting the feature data points to form a first freeform surface imaging optical system. The first freeform surface imaging optical system is taken as the initial system for multiple iterations to obtain a second freeform surface imaging optical system. The second freeform surface imaging optical system is taken as a first base system. A first surface freedom of the first base system is selected, the values nearby the first surface freedom is selected, and surface positions and tilts of the first base system are changed to obtain a third freeform surface imaging optical system that satisfies the constraint condition. A second base system is selected and the method above is repeated. The freeform surface imaging optical system is obtained until all freedoms for surface positions and tilts have been used.

18 Claims, 4 Drawing Sheets

METHOD FOR DESIGING FREEFORM SURFACE IMAGING OPTICAL SYSTEM

CROSS-REFERENCE TO RELATED APPLICATIONS

This application claims all benefits accruing under 35 U.S.C. § 119 from China Patent Application No. 201611213648.2, field on Dec. 22, 2016 in the China Intellectual Property Office, disclosure of which is incorporated herein by reference.

FIELD

The present disclosure relates to a method for designing freeform surface imaging optical system.

BACKGROUND

Conventional methods for designing freeform surface imaging optical system comprise steps of finding a good starting point, and then conducting a computer-aided optimization.

However, conventional methods are not very intelligent and automated; and a function of conventional methods is not yet enough. For example, conventional methods highly rely on the starting point, if a difference between the structure and parameters of the starting point and that of design requirements is big, it may take a long time to optimize. Moreover, for the imaging optical systems with advanced specifications and special configuration, it may not be able to find an appropriate starting point. An optimization process is a combination of "science" and "art", a software optimization algorithm, people's guidance and intervention in the optimization process, and people's experience and skills are important. Thus, a whole design process is highly dependent on human effort.

BRIEF DESCRIPTION OF THE DRAWINGS

Implementations of the present technology will now be described, by way of example only, with reference to the attached figures.

DETAILED DESCRIPTION

Figure 1:
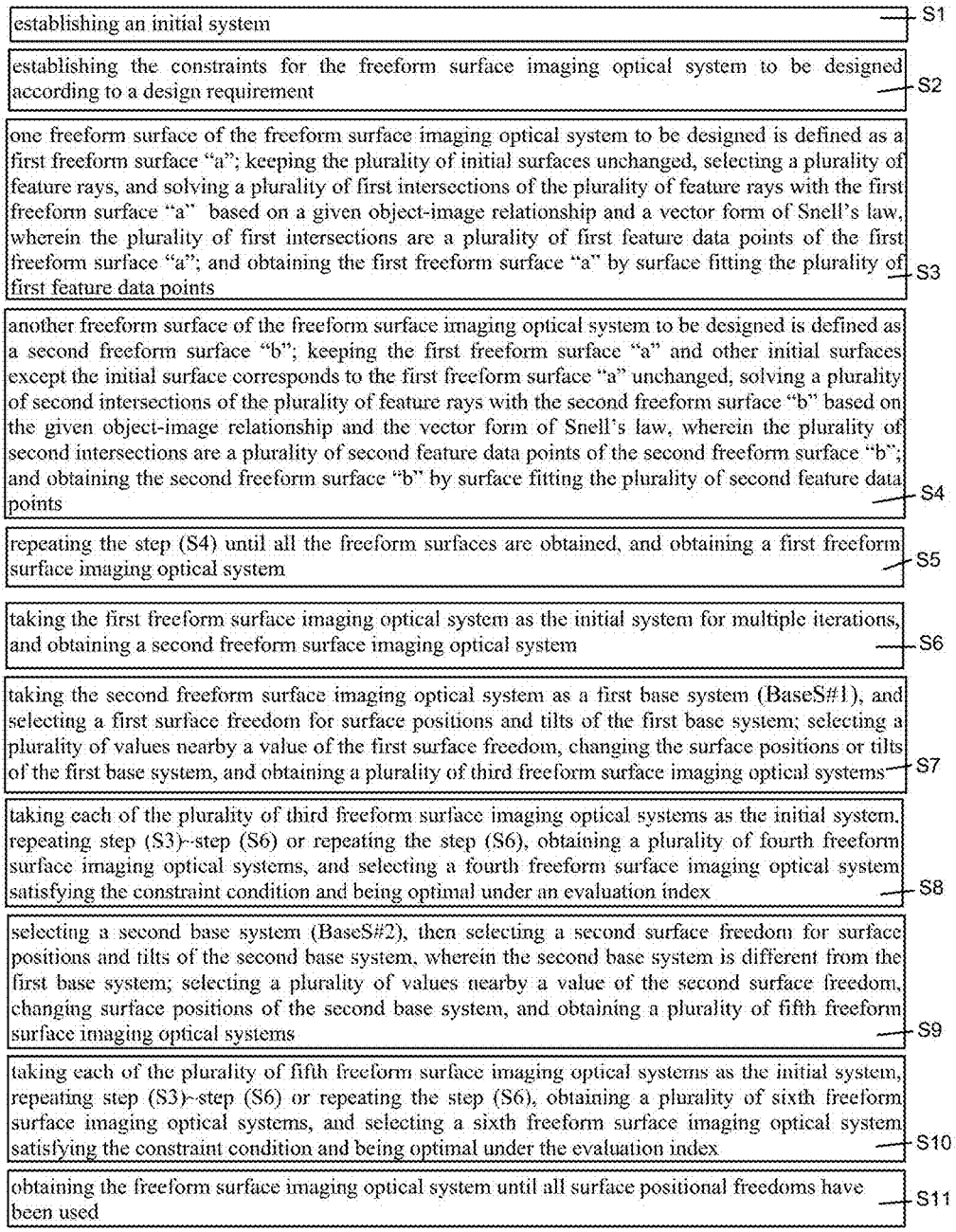
FIG. 1 is a flow diagram of a method for designing freeform surface imaging optical system according to one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Referring to FIG. 1, a method for designing a freeform surface imaging optical system of one embodiment is provided. The method comprises the following steps:

step (S1), establishing an initial system, wherein the initial system comprises a plurality of initial surfaces, and each of the plurality of initial surfaces corresponds to one freeform surface of a freeform surface imaging optical system to be designed;

step (S2), establishing the constraints for the freeform surface imaging optical system to be designed according to a design requirement;

step (S3), one freeform surface of the freeform surface imaging optical system to be designed is defined as a first freeform surface "a"; keeping the plurality of initial surfaces unchanged, selecting a plurality of feature rays $R_i$ (i=1, 2 ... K), and solving a plurality of first intersections of the plurality of feature rays $R_i$ (i=1, 2 ... K) with the first freeform surface "a" point by point based on a given object-image relationship and a vector form of Snell's law, wherein the plurality of first intersections are a plurality of first feature data points $P_i$ (i=1, 2 ... K) of the first freeform surface "a"; and obtaining the first freeform surface "a" by surface fitting the plurality of first feature data points $P_i$ (i=1, 2 ... K);

step (S4), another freeform surface of the freeform surface imaging optical system to be designed is defined as a second freeform surface "b"; keeping the first freeform surface "a" and other initial surfaces except the initial surface corresponds to the first freeform surface "a" unchanged, solving a plurality of second intersections of the plurality of feature rays $R_i$ (i=1, 2 ... K) with the second freeform surface "b" point by point based on the given object-image relationship and the vector form of Snell's law, wherein the plurality of second intersections are a plurality of second feature data points $P'_i$ (i=1, 2 ... K) of the second freeform surface "b"; and obtaining the second freeform surface "b" by surface fitting the plurality of second feature data points $P'_i$ (i=1, 2 ... K);

step (S5), repeating step (S4) until all the freeform surfaces that need to be solved are obtained, and obtaining a first freeform surface imaging optical system;

step (S6), taking the first freeform surface imaging optical system as the initial system for multiple iterations, and obtaining a second freeform surface imaging optical system;

step (S7), taking the second freeform surface imaging optical system as a first base system (BaseS#1), and selecting a first surface freedom for surface positions and tilts of the first base system; selecting a plurality of values nearby a value of the first surface freedom, changing the surface positions or tilts of the first base system, and obtaining a plurality of third freeform surface imaging optical systems;

step (S8), taking each of the plurality of third freeform surface imaging optical systems as the initial system, repeating step (S3)~step (S6) or repeating step (S6), obtaining a plurality of fourth freeform surface imaging optical systems, and selecting a fourth freeform surface imaging optical system satisfying the constraint condition and being optimal under an evaluation index;

step (S9), selecting a second base system (BaseS#2), then selecting a second surface freedom for surface positions and tilts of the second base system, wherein the second base system is different from the first base system; selecting a plurality of values nearby a value of the second surface freedom, changing surface positions of the second base system, and obtaining a plurality of fifth freeform surface imaging optical systems;

step (S10), taking each of the plurality of fifth freeform surface imaging optical systems as the initial system, repeating step (S3)~step (S6) or repeating step (S6), obtaining a plurality of sixth freeform surface imaging optical systems, and selecting a sixth freeform surface imaging optical system satisfying the constraint condition and being optimal under the evaluation index; and step (S11), obtaining the freeform surface imaging optical system until all surface positional freedoms have been used.

In step (S1), the initial surface can be a planar surface or a spherical surface. The locations of the plurality of initial surfaces can be selected according to the freeform surface imaging optical system actual needs.

In step (S2), the constraint condition comprises controlling a light block, eliminating positional interference between surfaces, and controlling a positional relationship between freeform surfaces.

Figure 2:
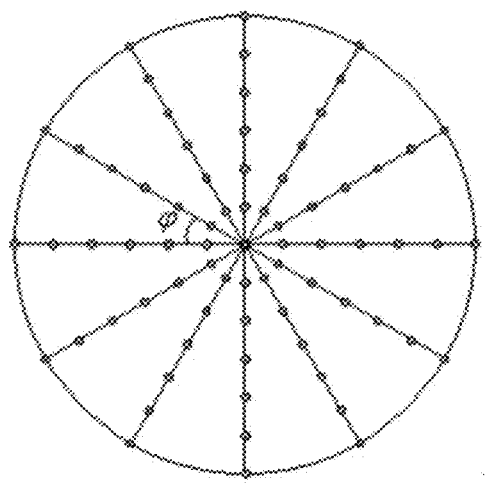
FIG. 2 is a schematic view of a selecting method of a plurality of feature rays employed in each field.

In step (S3), a method of selecting the plurality of feature rays Ri (i=1, 2 . . . K) comprises: M fields are selected according to the optical systems actual needs, an aperture of each of the M fields is divided into N equal parts, and P feature rays at different aperture positions in each of the N equal parts are selected. As such, K=M×N×P different feature rays corresponding to different aperture positions and different fields are fixed. The aperture can be a circle, a rectangle, a square, an oval or other shapes. As shown in FIG. 2, in one embodiment, the aperture of each of the M fields is a circle, and a circular aperture of each of the M fields is divided into N angles with equal interval φ, as such, N=2π/φ, and then, P different aperture positions are fixed along a radial direction of each of the N angles. Therefore, K=M×N×P different feature rays corresponding to different aperture positions and different fields are fixed.

Figure 3:
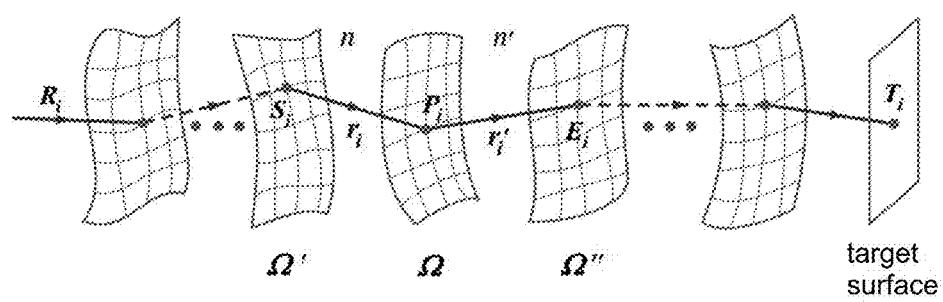
FIG. 3 is a schematic view of start point and end point of one feature ray while solving the feature data points.

Referring to FIG. 3, a surface Ω is defined as an unknown freeform surface, a surface Ω' is defined as a surface located adjacent to and before the surface Ω, and a surface Ω" is defined as a surface located adjacent to and after the surface Ω The intersections of the plurality of feature rays $R_i$ (i=1, 2 . . . K) with the surface Ω are defined as the third feature data points P"$_i$ (i=1, 2 . . . K). The third feature data points P"$_i$ (i=1, 2 . . . K) can be obtained by the intersections of the feature rays $R_i$ (i=1, 2 . . . K) with the surface Ω' and the surface Ω". The plurality of feature rays (i=1, 2 . . . K) are intersected with the surface Ω' at a plurality of start points $S_i$ (i=1, 2 . . . K), and intersected with the surface Ω" at a plurality of end points $E_i$ (i=1, 2 . . . K). When the surface Ω and the plurality of feature rays $R_i$ (i=1, 2 . . . K) are determined, the plurality of start points $S_i$ (i=1, 2 . . . K) of the feature rays $R_i$ (i=1, 2 . . . K) can also be determined. The plurality of end points $E_i$ (i=1, 2 . . . K) can also be obtained based on the object-image relationship or given mapping relationship. Under ideal conditions, the feature rays $R_i$ (i=1, 2 . . . K) emitted from the plurality of start points $S_i$ (i=1, 2 . . . K) on the surface Ω'; pass through the third feature data points P"$_i$ (i=1, 2 . . . K) on the surface Ω; intersect with the surface Ω" at the plurality of end points $E_i$ (i=1, 2 . . . K); and finally intersect with the image plane at the plurality of ideal target points $T_{i,ideal}$ (i=1, 2 . . . K). If the surface Ω" is the target plane, the plurality of end points $E_i$ (i=1, 2 . . . K) are the plurality of ideal target points $I_i$ (i=1, 2 . . . K). If there are other surfaces between the surface Ω and the target plane, the plurality of end points $E_i$ (i=1, 2 . . . K) are the points on the surface Ω", which make the first variation of the optical path length between the first feature data points P"$_i$ (i=1, 2 . . . K) and their corresponding target points zero. $\delta S = \delta \int_{P_i}^{T_i} nds = 0$, wherein ds is the differential elements of the optical path length along the plurality of feature rays $R_i$ (i=1, 2 . . . K), n denotes the refractive index of the medium, and δ denotes a differential variation.

The plurality of first feature data points $P_i$ (i=1, 2 . . . K) can be obtained by the following two calculating methods.

A first calculating method comprises the following substeps:

step (a): defining a first intersection of a first feature ray $R_i$ and the initial surface as a feature data point $P_i$;

step (b): when i (1≤i≤K−1) first feature data points $P_i$ (1≤i≤K−1) have been obtained, a unit normal vector $\vec{N}_i$ (1≤i≤K−1) at each of the i (1≤i≤K−1) first feature data points $P_i$ (1≤i≤K−1) can be calculated based on a vector form of Snell's Law;

step (c): making a first tangent plane at the i (1≤i≤K−1) first feature data points $P_i$ (1≤i≤K−1) respectively; thus i first tangent planes can be obtained, and i×(K−i) second intersections can be obtained by the i first tangent planes intersecting with remaining (K−i) feature rays; and a second intersection, which is nearest to the i (1≤i≤K−1) first feature data points $P_i$, is fixed from the i×(K−i) second intersections as a next feature data point $P_{i+1}$ (1≤i≤K−1); and step (d): repeating steps (b) and (c), until all the plurality of first feature data points $P_i$ (i=1, 2 . . . K) are calculated.

In step (b), the unit normal vector $\vec{N}_i$ (1≤i≤K−1) at each of the feature data point $P_i$ (1≤i≤K−1) can be calculated based on the vector form of Snell's Law. When the first freeform surface is a refractive surface, $$\vec{N}_i = \frac{n'\vec{r}'_i - n\vec{r}_i}{|n'\vec{r}'_i - n\vec{r}_i|} \quad (1)$$

Wherein $$\vec{r}_i = \frac{\overrightarrow{P_i S_i}}{|\overrightarrow{P_i S_i}|}$$

is a unit vector along a direction of an incident ray for the first freeform surface;

$$\vec{r}'_i = \frac{\overrightarrow{E_i P_i}}{|\overrightarrow{E_i P_i}|}$$

is a unit vector along a direction for an exit ray of the first freeform surface; and n, n' is refractive index of a media before and after the first freeform surface respectively.

Similarly, when the first freeform surface is a reflective surface, $$\vec{N}_i = \frac{\vec{r}_i' - \vec{r}_i}{|\vec{r}_i' - \vec{r}_i|} \quad (2)$$

The unit normal vector $\vec{N}_i$ at each of the plurality of first feature data points $P_i$ (i=1, 2 . . . K) is perpendicular to the first tangent plane at each of the plurality of first feature data points $P_i$ (i=1, 2 . . . K). Thus, the first tangent plane at each of the plurality of first feature data points $P_i$ (i=1, 2 . . . K) can be obtained.

The first calculating method comprises a computational complexity formula of $$T(K) = \sum_{i=1}^{K-1} i(K-i) = \frac{1}{6}K^3 - \frac{1}{6}K = O(K^3).$$

When a large quantity of feature rays are used in a design, the first calculating method requires a long computation time.

A second calculating method comprises the following sub-steps:

step (a'): defining a first intersection of a first feature light ray $R_1$ and the initial surface as a feature data point $P_1$;

step (b'): when an ith (1≤i≤K−1) first feature data point $P_i$ (1≤i≤K−1) has been obtained, a unit normal vector $\vec{N}_i$ at the ith (1≤i≤K−1) first feature data point $P_i$ (1≤i≤K−1) can be calculated based on the vector form of Snell's law;

step (c'): making a first tangent plane through the ith (1≤i≤K−1) first feature data point $P_i$ (1≤i≤K−1), and (K−i) second intersections can be obtained by the first tangent plane intersecting with remaining (K−i) feature rays; a second intersection which is nearest to the ith (1≤i≤K−1) first feature data point $P_i$ (1≤i≤K−1), is fixed; and a feature ray corresponding to the second intersection $Q_{i+1}$ is defined as $R_{i+1}$, a shortest distance between the second intersection $Q_{i+1}$ and the ith first feature data point $P_i$ (1≤i≤K−1) is defined as $d_i$;

step (d'): making a second tangent plane at (i−1) first feature data points that are obtained before the ith first feature data point $P_i$ (1≤i≤K−1) respectively; thus, (i−1) second tangent planes can be obtained, and (i−1) third intersections can be obtained by the (i−1) second tangent planes intersecting with a feature ray $R_{i+1}$; in each of the (i−1) second tangent planes, each of the (i−1) third intersections and its corresponding first feature data point form an intersection pair; the intersection pair, which has the shortest distance between a third intersection and its corresponding first feature data point, is fixed; and the third intersection and the shortest distance is defined as $Q'_{i+1}$ and $d'_i$ respectively;

step (e'): comparing $d_i$ and $d'_i$, if $d_i \leq d'_i$, $Q_{i+1}$ is taken as the next first feature data point $P_{i+1}$ (1≤i≤K−1); otherwise, is taken as the next first feature data point $P_{i+1}$ (1≤i≤K−1); and step (f'): repeating steps from (b') to (e'), until the plurality of first feature data points $P_i$ (i=1, 2 . . . K) are all calculated.

In step (b'), a calculating method of the unit normal vector $\vec{N}_i$ at the ith (1≤i≤K−1) feature data point $P_i$ (1≤i≤K−1) is the same as the first calculating method.

A second calculating method comprises a computational complexity formula of $$T(K) = \sum_{i=1}^{K-1} K - i + i - 1 = (K-1)^2 = O(K^2).$$

When a large quantity of feature rays are used in a design, the computational complexity of the second calculating method is much smaller than the computational complexity of the first calculating method.

An equation of the first freeform surface "a" comprises a conic term and a freeform surface term. The equation of the first freeform surface "a" can be expressed as follows:

$$z(x, y) = \frac{c(x^2 + y^2)}{1 + \sqrt{1 - (1+k)c^2(x^2 + y^2)}} + \sum_{j=1}^{N} A_j g_j(x, y),$$

wherein, $$\frac{c(x^2 + y^2)}{1 + \sqrt{1 - (1+k)c^2(x^2 + y^2)}}$$

is the conic term, c is a curvature of a conic surface at the vertex, k is a conic constant;

$$\sum_{j=1}^{N} A_j g_j(x, y)$$

is the freeform surface term, $A_i$ represents the ith term coefficient. The freeform surface term can be XY polynomials, Zernike polynomials, Chebyshev polynomials, or the like.

In one embodiment, a space of the initial system is defined as a first three-dimensional rectangular coordinates system. A propagation direction of beams is defined as a Z-axis, and the Z-axis is perpendicular to an XOY plane.

A method for surface fitting the plurality of first feature data points $P_i$ (i=1, 2 . . . K) comprises:

step (31): surface fitting the plurality of first feature data points $P_i$ (i=1, 2 . . . K) to a sphere in the first three-dimensional rectangular coordinates system, and obtaining a curvature c of the sphere and a curvature center $(x_c, Y_c, z_c)$ corresponding to the curvature c of the sphere;

step (S32): defining a feature data point $(x_o, y_o, z_o)$ corresponding to a chief ray of the central field angle among the entire field-of-view (FOV) as the vertex of the sphere, defining a second three-dimensional rectangular coordinates system by the vertex of the sphere as origin and a line passing through the curvature center and the vertex of the sphere as a Z'-axis;

step (S33): transforming the coordinates $(x_i, y_i, z_i)$ and the normal vector $(\alpha_i, \beta_i, \gamma_i)$, of the plurality of first feature data points $P_i$ (i=1, 2 . . . K) in the first three-dimensional rectangular coordinates system, into the coordinates $(x'_i, y'_i, z'_i)$ and the normal vector $(\alpha'_i, \beta'_i, \gamma'_i)$, of the plurality of first feature data points $P_i$ (i=1, 2 ... K) in the second three-dimensional rectangular coordinates system;

step (S34): fitting the plurality of first feature data points $P_i$ (i=1, 2 ... K) into the conic surface in the second three-dimensional rectangular coordinates system, based on the coordinates $(x'_i, y'_i, z'_i)$ and the curvature c of the sphere, and obtaining the conic constant k; and step (S35): removing the coordinates and the normal vector of the plurality of first feature data points $P_i$ (i=1, 2 ... K), on the conic surface in the second three-dimensional rectangular coordinates system, from the coordinates $(x'_i, y'_i, z'_i)$ and the normal vector $(\alpha'_i, \beta'_i, \gamma'_i)$, to obtain a residual coordinate and a residual normal vector; and fitting the residual coordinate and the residual normal vector to obtain a freeform surface; the equation of the first freeform surface can be obtained by adding an conic surface equation and an freeform surface equation.

Generally, the optical systems are symmetric about the YOZ plane. Therefore, a tilt angle θ of the sphere, in the Y'O'Z' plane of the second three-dimensional rectangular coordinates system relative to in the YOZ plane of the first three-dimensional rectangular coordinates system, is:

$$\theta = \arctan\left(\frac{y_o - y_c}{z_o - z_c}\right).$$

A relationship between the coordinates $(x'_i, y'_i, z'_i)$ and the coordinates $(x_i, y_i, z_i)$ of each of the plurality of first feature data points $P_i$ (i=1, 2 ... K) can be expressed as following:

$$\begin{cases} x'_i = x_i = x_o \\ y'_i = (y_i - y_o)\cos\theta - (z_i - z_o)\sin\theta \\ z'_i = (y_i - y_o)\sin\theta + (z_i - z_o)\cos\theta \end{cases}.$$

A relationship between the normal vector $(\alpha'_i, \beta'_i, \gamma'_i)$ and the normal vector $(\alpha_i, \beta_i, \gamma_i)$ of each of the plurality of first feature data points $P_i$ (i=1, 2 ... K) can be expressed as following:

$$\begin{cases} \alpha'_i = \alpha_i \\ \beta'_i = \beta_i\cos\theta - \gamma_i\sin\theta \\ \gamma'_i = \beta_i\sin\theta + \gamma_i\cos\theta \end{cases}.$$

In the second three-dimensional rectangular coordinates system, the coordinates and the normal vector of the plurality of first feature data points $P_i$ (i=1, 2 ... K) on the conic surface are defined as $(x'_i, y'_i, z'_i)$ and $(\alpha'_{is}, \beta'_{is}, \gamma'_{is})$ respectively. An Z'-axis component of the normal vector is normalized to −1. The residual coordinate $(x''_i, y''_i, z''_i)$ and the residual normal vector $(\alpha''_i, \beta''_i, -1)$ can be obtained, wherein $(x''_i, y''_i, z''_i) = (x'_i, y'_i, z'_i - z'_{is})$ and $$(\alpha''_i, \beta''_i, -1) = \left(-\frac{\alpha'_i}{\gamma'_i} + \frac{\alpha'_{is}}{\gamma'_{is}}, -\frac{\beta'_i}{\gamma'_i} + \frac{\beta'_{is}}{\gamma'_{is}}, -1\right).$$

In step (S35), a method of surface fitting the residual coordinate and the residual normal vector comprises:

step (S351): in the second three-dimensional rectangular coordinates system, expressing a polynomial surface by the polynomial surface equation leaving out the conic surface term, the polynomial surface can be expressed in terms of the following equation:

$$z = f(x, y; P) = \sum_{j=1}^{J} P_j g_j(x, y),$$

wherein $g_j(x, y)$ is one item of the polynomial, and $P=(p_1, p_2, \ldots, p_J)^T$ is the coefficient sets;

step (S352): acquiring a first sum of squares $d_1(P)$, of residual coordinate differences in z' direction between the residual coordinate value $(x''_i, y''_i, z''_i)$ (i=1, 2, ..., K) and the freeform surface; and a second sum of squares $d_2(P)$, of modulus of vector differences between the residual normal vector $N_i=(\alpha''_i, \beta''_i, -1)$ (i=1, 2, ..., K) and a normal vector of the freeform surface, wherein the first sum of squares $d_1(P)$ is expressed in terms of a first equation:

$$d_1(P) = \sum_{i=1}^{I} [z_i - f(x''_i, y''_i; P)]^2 = (Z - A_1P)^T(Z - A_1P),$$

and
the second sum of squares $d_2(P)$ is expressed in terms of a second equation:

$$d_2(P) = \sum_{i=1}^{I} \{[u_i - f_{x''}(x''_i, y''_i; P)]^2 + [v_i - f_{y''}(x''_i, y''_i; P)]^2\} =$$
$$(U - A_2P)^T(U - A_2P) + (V - A_3P)^T(V - A_3P);$$

wherein, $Z = (z_1, z_2, \ldots, z_I)^T,$ $U = (u_1, u_2, \ldots, u_I)^T,$ $V = (v_1, v_2, \ldots, v_I)^T,$ $$A_1 = \begin{pmatrix} g_1(x''_1, y''_1) & g_2(x''_1, y''_1) & \cdots & g_J(x''_1, y''_1) \\ g_1(x''_2, y''_2) & g_2(x''_2, y''_2) & \cdots & g_J(x''_2, y''_2) \\ \vdots & \vdots & & \vdots \\ g_1(x''_I, y''_I) & g_2(x''_I, y''_I) & \cdots & g_J(x''_I, y''_I) \end{pmatrix},$$

$$A_2 = \begin{pmatrix} g_1^x(x''_1, y''_1) & g_2^x(x''_1, y''_1) & \cdots & g_J^x(x''_1, y''_1) \\ g_1^x(x''_2, y''_2) & g_2^x(x''_2, y''_2) & \cdots & g_J^x(x''_2, y''_2) \\ \vdots & \vdots & & \vdots \\ g_1^x(x''_I, y''_I) & g_2^x(x''_I, y''_I) & \cdots & g_J^x(x''_I, y''_I) \end{pmatrix},$$

$$A_3 = \begin{pmatrix} g_1^y(x''_1, y''_1) & g_2^y(x''_1, y''_1) & \cdots & g_J^y(x''_1, y''_1) \\ g_1^y(x''_2, y''_2) & g_2^y(x''_2, y''_2) & \cdots & g_J^y(x''_2, y''_2) \\ \vdots & \vdots & & \vdots \\ g_1^y(x''_I, y''_I) & g_2^y(x''_I, y''_I) & \cdots & g_J^y(x''_I, y''_I) \end{pmatrix};$$

step (S353): obtaining an evaluation function, $P = (A_1^T A_1 + wA_2^T A_2 + wA_3^T A_3)^{-1}(A_1^T Z + wA_2^T U + wA_3^T V),$ wherein w is a weighting greater than 0;

step (S354): selecting different weightings w and setting a gradient $\nabla f(P)$ of the evaluation function equal to 0, to obtain a plurality of different values of P and a plurality of freeform surface shapes z=f (x, y; P) corresponding to each of the plurality of different values of P; and step (S355): choosing a final freeform surface shape $\Omega_{opt}$ which has a best imaging quality from the plurality of freeform surface shapes z=f (x, y; P).

In step (S4), the plurality of second feature data points $P'_i$ (i=1, 2 ... K) can be solved and the second freeform surface "b" can be obtained by the same methods provided in the step (S3).

In step (S5), the other freeform surfaces can be obtained by the same methods provided in the step (S3). The number of all of the freeform surfaces that need to be solved can be the same or less than the number of the plurality of initial surfaces of step (S1). When the step (S3) is repeated to obtain other freeform surfaces, the freeform surfaces that have been obtained and some of the plurality of initial surfaces that does not corresponds to the obtained freeform surfaces are kept unchanged.

In step (S6), the multiple iterations can be carried out by the following two methods.

A first method for multiple iterations comprises the following sub-steps:

step (S61): a plurality of actual intersections of the plurality of feature rays $R_i$ (i=1, 2 ... K) with the first freeform surface "a" are solved according to the equation of the first freeform surface "a" and defined as the first feature data points $P_i$ (i=1, 2, ..., K), a unit normal vector at each of the first feature data points $P_i$ (i=1, 2, ..., K) is calculated, and the first feature data points $P_i$ (i=1, 2, ..., K) are surface fitted with the method in step (S3), to obtain an after-iteration first freeform surface "a";

step (S62): a plurality of actual intersections of the plurality of feature rays $R_i$ (i=1, 2 ... K) with the second freeform surface "b" are solved according to the equation of the second freeform surface "b" and defined as the second feature data points $P'_i$ (i=1, 2, ..., K), a unit normal vector at each of the second feature data points $P'_i$ (i=1, 2, ..., K) is calculated, and the second feature data points $P'_i$ (i=1, 2, ..., K) are surface fitted with the method in step (S4), to obtain an after-iteration second freeform surface "b"; and step (S63): repeating the step (S62) until all the freeform surfaces obtained in step (S5) are solved and surface fitted again to obtain all the after-iteration freeform surfaces, thereby an after-iteration freeform surface imaging optical system is obtained and the iteration process is performed once; and step (S64): the after-iteration freeform surface imaging optical system obtained in step (S63) is used as the initial system, and a plurality of other iteration process are performed by repeating step (S61) to step (S63), until a plurality of actual intersections of the plurality of feature rays $R_i$ (i=1, 2 ... K) with the target surface are close to the ideal target points, a iteration process is finished.

A second method for multiple iterations comprises the following sub-steps:

step (S61'), repeating step (S3) to step (S5), thereby an after-iteration freeform surface imaging optical system is obtained and the iteration process is performed once;

step (S62'), the after-iteration freeform surface imaging optical system generated by step (S61') is taken as the initial system, and repeating step (S61'), until the plurality of actual intersections of the plurality of feature rays $R_i$ (i=1, 2 ... K) with the target surface are close to the ideal target points, the iteration process is finished.

Compared to the second method for iteration, the first method for iteration is simpler and takes shorter time.

Figure 4:
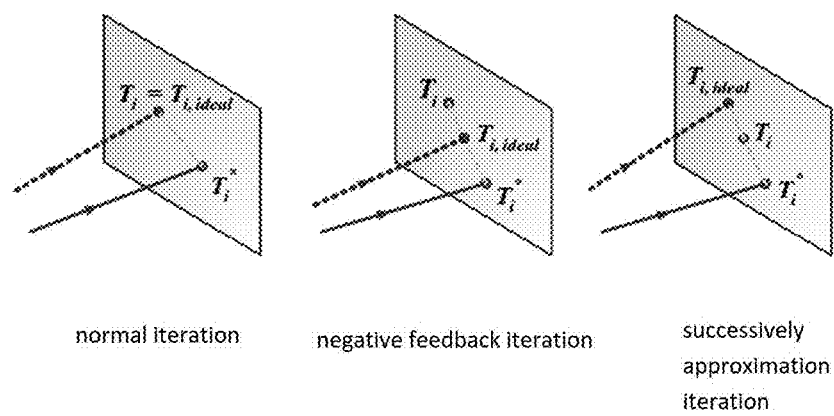
FIG. 4 shows a schematic view of one embodiment of types of the iterative process of freeform surface imaging optical system.

FIG. 4 illustrates that the type of the iteration can be normal iteration, negative feedback iteration, or successively approximation iteration. The negative feedback iteration is faster. The successively approximation iteration is more stable.

In the normal iteration, the target point $T_i$ is the ideal target point $T_{i,ideal}$.

$$T_i = T_{i,ideal}.$$

In negative feedback iteration, the negative feedback function can be written as:

$$T_i = \begin{cases} T_{i,ideal} + \varepsilon\Delta & \text{if } (T_{i,ideal} - T_i^*) > \Delta \\ T_{i,ideal} + \varepsilon(T_{i,ideal} - T_i^*) & \text{if } -\Delta \leq (T_{i,ideal} - T_i^*) \leq \Delta, \\ T_{i,ideal} - \varepsilon\Delta & \text{if } (T_{i,ideal} - T_i^*) < -\Delta \end{cases}$$

wherein c is the feedback coefficient, and $\varepsilon$ is larger than zero; $T_i^*$ is the actual intersections of the plurality of feature rays $R_i$ (i=1, 2 ... K) with the target surface before the current iteration and after the previous iteration; $\Delta$ is a feedback threshold, and $\Delta$ is larger than zero, the feedback threshold is conducive to avoid instability of the iterative process caused by a dramatic change of $T_i$ due to large deviation between $T_i^*$ and $T_{i,ideal}$.

In the successively approximation iteration, $$T_i = T_i^* + \rho(T_{i,ideal} - T_i^*),$$

wherein $\rho$ is the approximation coefficient, and $\rho$ is larger than zero.

In step (S7), the first surface freedom comprises an x-direction displacement, a y-direction displacement, or an z-direction displacement of a freeform surface of the first base system; an x-direction displacement, a y-direction displacement, or an z-direction displacement of an image plane of the first base system; a rotation angle around x axis, a rotation angle around y axis, or a rotation angle around z axis of the freeform surface of the first base system; a rotation angle around x axis, a rotation angle around y axis, or a rotation angle around z axis of the image plane of the first base system.

In step (S7), changing surface positions of the first base system comprises changing the positions and tilts of all the freeform surfaces of the first base system, and changing the position of the image plane of the first base system. The plurality of third freeform surface imaging optical systems has a certain change relative to the first base system. The plurality of third freeform surface imaging optical systems are perturbed.

When taking each of the plurality of third freeform surface imaging optical systems as the initial system, only repeating the step (S6), the negative feedback iteration cannot be used during the first iteration process.

In one embodiment, the evaluation index is the root mean square (RMS) of the deviation between the actual intersection of the plurality of feature rays with the target surface and the ideal target points. A RMS value $\sigma_{RMS}$ can be expressed:

$$\sigma_{RMS} = \sqrt{\frac{\sum_{m=1}^{K} \sigma_m^2}{K}},$$

wherein K is the number of the feature rays, $\sigma_m$ is the distance between the actual intersection of the $m^{th}$ feature ray with the target surface and the ideal target points.

When the $\sigma_{RMS}$ of the fourth freeform surface imaging optical system satisfying the constraint conditions and being optimal under the evaluation index is less than the $\sigma_{RMS}$ of the first base system, the fourth freeform surface imaging optical system satisfying the constraint conditions and being optimal under the evaluation index is as the second base system; on the contrary, the first base system is as the second base system.

In step (S9), changing surface positions of the second base system comprises changing the positions and tilts of all the freeform surfaces of the second base system, and changing the position and tilt of the image plane of the second base system. The plurality of fifth freeform surface imaging optical systems have a certain change relative to the second base system. The plurality of fifth freeform surface imaging optical systems are unstable.

When taking each of the plurality of fifth freeform surface imaging optical systems as the initial system, only repeating the step (S6), the negative feedback iteration can not be used during the first iteration process.

The constraint conditions can be changed throughout the entire process from step (S7) to step (S11). The constraint conditions can be loose in the early process, and the constraint conditions gradually become strict in the latter process. In one embodiment, the constraint conditions are relatively loose in steps (S7)-(S10), and are more stringent in step (S11).

In the latter process of step (S7) to step (S11), the number of feature rays can be greater than K, and the maximum number of highest order term of the equation used in freeform surface fitting can also be increased. In one embodiment, in step (S11), the number of feature rays is greater than K, and the maximum number of highest order term of the equation used in freeform surface fitting is increased.

In the early stages of the entire design process, the shape of freeform surface changes greatly. If the aperture stop of the freeform surface imaging optical system is not at the forefront of the optical system, a large deformation of the freeform surface may cause a large change in the location of the entrance pupil, and thus make the light participated in imaging changes. Thus, in the early stages of the entire design process, through increase the entrance pupil diameter of the freeform surface imaging optical system, to reduce the impact of the change in the location of the entrance pupil. In the later stages of the entire design process, since the shape of freeform surface changes little, the entrance pupil diameter of the freeform surface imaging optical system can be restored to normal. In one embodiment, the aperture stop of the freeform surface imaging optical system is not at the forefront of the optical system, in steps (S1)-(S10), the entrance pupil diameter of the freeform surface imaging optical system is larger, and in step (S11), the entrance pupil diameter of the freeform surface imaging optical system can be restored to normal.

Generally, for the freeform surface imaging optical system, requirements for image quality are high; however, requirements for the system distortion are not high. Therefore, in the latter process of step (S7) to step (S11), a "high priority for image quality" mode can be selected. Under the "image quality priority" mode, the ideal target point is not the ideal image point, but an actual intersection of the target surface and the main ray of the field of view corresponding to the freeform surface imaging optical system before each round of iteration. Under the "high priority for image quality" mode, the construction and iterative process can be evaluated by an evaluation index $\sigma^*_{RMS}$, $$\sigma^*_{RMS} = \sqrt{\frac{\sum_{m=1}^{K} \sigma_m^{*2}}{K}},$$

wherein K is the number of the feature rays, $\sigma^*_m$ is the distance between the actual intersection, of the mth feature ray and the target surface, and the actual intersection, of the target surface and the main ray of the field of view corresponding to the freeform surface imaging optical system before each iteration.

Furthermore, steps of using the freeform surface imaging optical system obtained in step (S11) as a new base system, and repeating steps (S7) to (S11) at least once, can be performed.

The method for designing freeform surface imaging optical system can be implemented via computer software. Furthermore, a freeform surface imaging optical system can be made according to the method.

The method for designing freeform surface imaging optical system can have many advantages. First, the method considers both the coordinates and the normal vectors of the plurality of feature data points; therefore, the shape of the freeform surface imaging optical system designed by the method is accurate. And the method can improve the optical properties of the freeform surface imaging optical system. Second, two three-dimensional rectangular coordinates systems are defined, after a quadratic surface is obtained in the first three-dimensional rectangular coordinates system, the coordinates and the normal vector of the plurality of feature data points in the first three-dimensional rectangular coordinates system are transformed into the second three-dimensional rectangular coordinates system, then the freeform surfaces of the freeform surface imaging optical system are obtained by surface fitting. The method is more precisely compared to conventional methods. Third, the freeform surface imaging optical system are designed by iteration steps, the plurality of actual intersections of the plurality of feature rays with the target surface are close to the ideal target points, therefore, the image quality of the freeform surface imaging optical system is high, and distortion and average RMS spot diameters of the freeform surface imaging optical system is reduced. Fourth, a system consisting of simple plane as a design input, if expected image relationship or ray mapping relationship, and certain structural constraints are given, an automatic design of high imaging quality freeform surface imaging optical system can be realized. Therefore, the problem of lack of starting point of conventional method can overcome. Further, the optimization step is not necessary, greatly reducing the human effort It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for designing a freeform surface imaging optical system comprising:

step (S1), establishing a first initial system, wherein the initial system comprises a plurality of initial surfaces, and each of the plurality of initial surfaces corresponds to one freeform surface of a freeform surface imaging optical system to be designed;

step (S2), establishing a constraint condition for the freeform surface imaging optical system to be designed according to a design requirement;

step (S3), selecting an Nth freeform surface of the freeform surface imaging optical system to be designed, wherein N=1; keeping the plurality of initial surfaces unchanged, selecting a plurality of feature rays $R_i$ (i=1, 2 . . . K), and solving an Nth plurality of intersections of the plurality of feature rays $R_i$ (i=1, 2 . . . K) with the Nth freeform surface point by point based on a given object-image relationship and a vector form of Snell's law, wherein the Nth plurality of intersections are an Nth plurality of feature data points $P_i$ (i=1, 2 . . . K) of the Nth freeform surface; and obtaining the Nth freeform surface by surface fitting the Nth plurality of feature data points $P_i$ (i=1, 2 . . . K);

step (S4), keeping all the Nth freeform surface obtained in step (S2) and some of the plurality of initial surfaces that does not corresponds to the Nth freeform surface unchanged, and selecting N as N=N+1;

step (S5), repeating step (S3)~step (S4) until all the freeform surfaces of the freeform surface imaging optical system to be designed being obtained, and obtaining a first freeform surface imaging optical system;

step (S6), taking the first freeform surface imaging optical system as a second initial system for multiple iterations, and obtaining a second freeform surface imaging optical system;

step (S7), taking the second freeform surface imaging optical system as a first base system, and selecting a first surface freedom for positions and tilts of the first base system; selecting a plurality of values nearby a value of the first surface freedom for positions and tilts, changing surface positions or tilts of the first base system, and obtaining a plurality of third freeform surface imaging optical systems;

step (S8), taking each of the plurality of third freeform surface imaging optical systems as a third initial system, repeating step (S3)~step (S6), obtaining a plurality of fourth freeform surface imaging optical systems, and selecting a fifth freeform surface imaging optical system from the plurality of fourth freeform surface imaging optical systems, wherein the fifth freeform surface imaging optical system satisfies the constraint condition and is optimal under an evaluation index;

step (S9), selecting a second base system, then selecting a second surface freedom for surface positions and tilts of the second base system, wherein the second base system is different from the first base system; selecting a plurality of values nearby a value of the second surface freedom for surface positions and tilts, changing surface positions or tilts of the second base system, and obtaining a plurality of sixth freeform surface imaging optical systems;

step (S10), taking each of the plurality of sixth freeform surface imaging optical systems as a fourth initial system, repeating step (S3)~step (S6), obtaining a plurality of seventh freeform surface imaging optical systems, and selecting an eighth freeform surface imaging optical system from a plurality of seventh freeform surface imaging optical systems, wherein the eighth freeform surface imaging optical system satisfies the constraint condition and is optimal under the evaluation index; and step (S11), obtaining the freeform surface imaging optical system until all surface positional freedoms have been used.

2. The method as claimed in claim 1, wherein the Nth plurality of feature data points $P_i$ (i=1, 2 . . . K) is obtained by:

step (a): defining a first intersection of a first feature ray $R_1$ and the initial surface as a feature data point $P_1$;

step (b): when i (1≤i≤K−1) first feature data points $P_i$ (1≤i≤K−1) have been obtained, a unit normal vector $\vec{N}_i$ (1≤i≤K−1) at each of the i (1≤i≤K−1) first feature data points $P_i$ (1≤i≤K−1) is calculated based on a vector form of Snell's Law;

step (c): making a first tangent plane at the i (1≤i≤K−1) first feature data points $P_i$ (1≤i≤K−1) respectively; thus i first tangent planes are obtained, and i×(K−i) second intersections are obtained by the i first tangent planes intersecting with remaining (K−i) feature rays; and a second intersection, which is nearest to the i (1≤i≤K−1) first feature data points $P_i$, is fixed from the i×(K−i) second intersections as a next feature data point $P_{i+1}$ (1≤i≤K−1); and step (d): repeating steps (b) and (c), until all the plurality of first feature data points $P_i$ (i=1, 2 . . . K) are calculated.

3. The method as claimed in claim 1, wherein the Nth plurality of feature data points $P_i$ (i=1, 2 . . . K) is obtained by:

step (a'): defining a first intersection of a first feature light ray $R_1$ and the initial surface as a feature data point $P_1$;

step (b'): when an ith (1≤i≤K−1) first feature data point $P_i$ (1≤i≤K−1) has been obtained, a unit normal vector $\vec{N}_i$ at the ith (1≤i≤K−1) first feature data point $P_i$ (1≤i≤K−1) is calculated based on the vector form of Snell's law;

step (c'): making a first tangent plane through the ith (1≤i≤K−1) first feature data point $P_i$ (1≤i≤K−1), and (K−i) second intersections are obtained by the first tangent plane intersecting with remaining (K−i) feature rays; a second intersection $Q_{i+1}$, which is nearest to the ith (1≤i≤K−1) first feature data point $P_i$ (1≤i≤K−1), is fixed; and a feature ray corresponding to the second intersection $Q_{i+1}$ is defined as $R_{i+1}$, a shortest distance between the second intersection $Q_{i+1}$ and the ith first feature data point $P_i$ (1≤i≤K−1) is defined as $d_i$;

step (d'): making a second tangent plane at (i−1) first feature data points that are obtained before the ith first feature data point $P_i$ (1≤i≤K−1) respectively; thus, (i−1) second tangent planes are obtained, and (i−1) third intersections are obtained by the (i−1) second tangent planes intersecting with a feature ray $R_{i+1}$; in each of the (i−1) second tangent planes, each of the (i−1) third intersections and its corresponding first feature data point form an intersection pair; the intersection pair, which has the shortest distance between a third intersection and its corresponding first feature data point, is fixed; and the third intersection and the shortest distance is defined as $Q'_{i+1}$ and $d'_i$ respectively;

step (e'): comparing $d_i$ and $d'_i$, if $d_i \le d'_i$, $Q_{i+1}$ is taken as the next first feature data point $P_{i+1}$ (1≤i≤K−1); otherwise, is taken as the next first feature data point $P_{i+1}$ (1≤i≤K−1); and step (f'): repeating steps from (b') to (e'), until the plurality of first feature data points $P_i$ (i=1, 2 ... K) are all calculated.

4. The method as claimed in claim 1, wherein surface fitting the Nth plurality of feature data points $P_i$ (i=1, 2 ... K) comprises:
   step (31): surface fitting the Nth plurality of feature data points $P_i$ (i=1, 2 ... K) to a sphere in a first three-dimensional rectangular coordinates system, and obtaining a curvature c of the sphere and a curvature center $(x_c, y_c, z_c)$ corresponding to the curvature c of the sphere;
   step (S32): defining a feature data point $(x_o, y_o, z_o)$ corresponding to a chief ray of a central field angle among entire field-of-view as a vertex of the sphere, defining a second three-dimensional rectangular coordinates system by the vertex of the sphere as origin and a line passing through the curvature center and the vertex of the sphere as a Z'-axis;
   step (S33): transforming a first coordinates $(x_i, y_i, z_i)$ and a first normal vector $(\alpha_i, \beta_i, \gamma_i)$, of the Nth plurality of feature data points $P_i$ (i=1, 2 ... K) in the first three-dimensional rectangular coordinates system, into a second coordinates $(x'_i, y'_i, z'_i)$ and a second normal vector $(\alpha'_i, \beta'_i, \gamma'_i)$, of the Nth plurality of feature data points $P_i$ (i=1, 2 ... K) in the second three-dimensional rectangular coordinates system;
   step (S34): fitting the Nth plurality of feature data points $P_i$ (i=1, 2 ... K) into a conic surface in the second three-dimensional rectangular coordinates system, based on the coordinates $(x'_i, y'_i, z'_i)$ and the curvature c of the sphere, and obtaining a conic constant k; and
   step (S35): removing a plurality of third coordinates and a plurality of third normal vector of the Nth plurality of feature data points $P_i$ (i=1, 2 ... K), on the conic surface in the second three-dimensional rectangular coordinates system, from the second coordinates $(x'_i, y'_i, z'_i)$ and the second normal vector $(\alpha'_i, \beta'_i, \gamma'_i)$, to obtain a plurality of residual coordinates and a plurality of residual normal vectors; and fitting the plurality of residual coordinates and the plurality of residual normal vectors to obtain a freeform surface; an Nth equation of the Nth freeform surface can be obtained by adding a first equation of the conic surface and a second equation of the freeform surface.

5. The method as claimed in claim 1, wherein a relationship between the second coordinates $(x'_i, y'_i, z'_i)$ and the first coordinates $(x_i, y_i, z_i)$ satisfies the following equation:

$$\begin{cases} x'_i = x_i = x_o \\ y'_i = (y_i - y_o)\cos\theta - (z_i - z_o)\sin\theta \\ z'_i = (y_i - y_o)\sin\theta + (z_i - z_o)\cos\theta \end{cases}$$

wherein $\theta$ is a tilt angle of the sphere, in a Y'O'Z' plane of the second three-dimensional rectangular coordinates system relative to in a YOZ plane of the first three-dimensional rectangular coordinates system.

6. The method of claim 4, wherein a relationship between the second normal vectors $(\alpha'_i, \beta'_i, \gamma'_i)$ and the first normal vectors $(\alpha_i, \beta_i, \gamma_i)$ satisfies the following equation:

$$\begin{cases} \alpha'_i = \alpha_i \\ \beta'_i = \beta_i\cos\theta - \gamma_i\sin\theta \\ \gamma'_i = \beta_i\sin\theta + \gamma_i\cos\theta \end{cases}$$

wherein $\theta$ is a tilt angle of the sphere, in a Y'O'Z' plane of the second three-dimensional rectangular coordinates system relative to in a YOZ plane of the first three-dimensional rectangular coordinates system.

7. The method of claim 4, wherein the multiple iterations comprises:
   step (S61): a Nth plurality of actual intersections of the plurality of feature rays $R_i$ (i=1, 2 ... K) with the Nth freeform surface are solved according to the Nth equation and defined as a Nth plurality of actual feature data points $P'_i$ (i=1, 2, ..., K), a unit normal vector at each of the Nth plurality of actual feature data points $P'_i$ (i=1, 2, ..., K) is calculated, and the Nth plurality of actual feature data points $P'_i$ (i=1, 2, ..., K) are surface fitted with the method in step (S2), to obtain an after-iteration Nth freeform surface;
   step (S62): selecting N as N=N+1;
   step (S63): repeating the step (S52) to step (S53) until all freeform surfaces obtained in step (S5) are solved and surface fitted again to obtain all after-iteration Nth freeform surfaces, thereby a first after-iteration freeform surface imaging optical system is obtained and an iteration process is performed once; and
   step (S64): the first after-iteration freeform surface imaging optical system obtained in step (S63) is used as a fifth initial system, and repeating step (S61) to step (S63), until the plurality of actual intersections of the plurality of feature rays $R_i$ (i=1, 2 ... K) with a target surface are close to ideal target points.

8. The method of claim 1, wherein the multiple iterations comprises:
   step (S61'), repeating step (S3)~step (S5), thereby an after-iteration freeform surface imaging optical system is obtained and an iteration process is performed once;
   step (S62'), the after-iteration freeform surface imaging optical system generated by step (S61') is taken as a sixth initial system, and repeating step (S61'), until the plurality of actual intersections of the plurality of feature rays $R_i$ (i=1, 2 ... K) with a target surface are close to ideal target points.

9. The method of claim 1, wherein the first surface positional freedom comprises an x-direction displacement of a freeform surface of the first base system, a y-direction displacement of the freeform surface of the first base system, an z-direction displacement of the freeform surface of the first base system, an x-direction displacement of an image plane of the first base system, a y-direction displacement of the image plane of the first base system, an z-direction displacement of the image plane of the first base system, a rotation angle around x axis of the freeform surface of the first base system, a rotation angle around y axis of the freeform surface of the first base system, a rotation angle around z axis of the freeform surface of the first base system, a rotation angle around x axis of the image plane of the first base system, a rotation angle around y axis of the image plane of the first base system, and a rotation angle around z axis of the image plane of the first base system.

10. The method of claim 1, wherein changing surface positions of the first base system comprises changing the positions of all the freeform surfaces of the first base system and changing a position of an image plane of the first base system.

11. The method of claim 10, wherein the plurality of third freeform surface imaging optical systems has a certain change relative to the first base system, and the plurality of third freeform surface imaging optical systems are unstable.

12. The method of claim 1, wherein the constraint condition comprises controlling a light block, eliminating positional interference between surfaces, and controlling a positional relationship between freeform surfaces.

13. The method of claim 1, wherein the evaluation index is a root mean square (RMS) of a deviation between the actual intersection of the plurality of feature rays with a target surface and an ideal target point.

14. The method of claim 13, wherein a RMS value is defined as $\sigma_{RMS}$, $$\sigma_{RMS} = \sqrt{\frac{\sum_{m=1}^{K} \sigma_m^2}{K}},$$

K is the number of the feature rays, $\sigma_m$ is a distance between the actual intersection of a $m^{th}$ feature ray with the target surface and the ideal target point.

15. The method of claim 14, wherein a first $\sigma_{RMS}$ of the fifth freeform surface imaging optical system is less than a second $\sigma_{RMS}$ of the first base system, the fifth freeform surface imaging optical system is as the second base system.

16. The method of claim 14, wherein a first $\sigma_{RMS}$ of the fifth freeform surface imaging optical system is larger than a second $\sigma_{RMS}$ of the first base system, the first base system is as the second base system.

17. The method of claim 1, further comprising steps of using the freeform surface imaging optical system obtained in step (S11) as a new base system, and repeating steps (S7) to (S11) at least one time.

18. A method for designing a freeform surface imaging optical system comprising:
- step (S1), establishing a first initial system, wherein the initial system comprises a plurality of initial surfaces, and each of the plurality of initial surfaces corresponds to one freeform surface of a freeform surface imaging optical system to be designed;
- step (S2), establishing a constraint condition of the freeform surface imaging optical system to be designed according to a design requirement;
- step (S3), selecting an Nth freeform surface of the freeform surface imaging optical system to be designed, wherein N=1; keeping the plurality of initial surfaces unchanged, selecting a plurality of feature rays $R_i$ (i=1, 2 . . . K), and solving an Nth plurality of intersections of the plurality of feature rays $R_i$ (i=1, 2 . . . K) with the Nth freeform surface point by point based on a given object-image relationship and a vector form of Snell's law, wherein the Nth plurality of intersections are an Nth plurality of feature data points $P_i$ (i=1, 2 . . . K) of the Nth freeform surface; and obtaining the Nth freeform surface by surface fitting the Nth plurality of feature data points $P_i$ (i=1, 2 . . . K);
- step (S4), keeping all the Nth freeform surface obtained in step (S2) and some of the plurality of initial surfaces that does not corresponds to the Nth freeform surface unchanged, and selecting N as N=N+1;
- step (S5), repeating step (S3)~step (S4) until all the freeform surfaces of the freeform surface imaging optical system to be designed being obtained, and obtaining a first freeform surface imaging optical system;
- step (S6), taking the first freeform surface imaging optical system as a second initial system for multiple iterations, and obtaining a second freeform surface imaging optical system;
- step (S7), taking the second freeform surface imaging optical system as a first base system, and selecting a first surface freedom for positions and tilts of the first base system; selecting a plurality of values nearby a value of the first surface freedom for positions and tilts, changing surface positions of the first base system, and obtaining a plurality of third freeform surface imaging optical systems;
- step (S8), taking each of the plurality of third freeform surface imaging optical systems as a third initial system, repeating step (S6), obtaining a plurality of fourth freeform surface imaging optical systems, and selecting a fifth freeform surface imaging optical system from the plurality of fourth freeform surface imaging optical systems, wherein the fifth freeform surface imaging optical system satisfies the constraint condition and is optimal under an evaluation index;
- step (S9), selecting a second base system, then selecting a second surface freedom for positions and tilts of the second base system, wherein the second base system is different from the first base system; selecting a plurality of values nearby a value of the second surface freedom for positions and tilts, changing surface positions or tilts of the second base system, and obtaining a plurality of sixth freeform surface imaging optical systems;
- step (S10), taking each of the plurality of sixth freeform surface imaging optical systems as a fourth initial system, repeating step (S6), obtaining a plurality of seventh freeform surface imaging optical systems, and selecting an eighth freeform surface imaging optical system from a plurality of seventh freeform surface imaging optical systems, wherein the eighth freeform surface imaging optical system satisfies the constraint condition and is optimal under the evaluation index; and
- step (S11), obtaining the freeform surface imaging optical system until all surface positional freedoms have been used.

* * * * *